US010089232B2

(12) United States Patent
Peng et al.

(10) Patent No.: US 10,089,232 B2
(45) Date of Patent: Oct. 2, 2018

(54) MODE SWITCHING FOR INCREASED OFF-CHIP BANDWIDTH

(71) Applicant: BOARD OF SUPERVISORS OF LOUISIANA STATE UNIVERSITY AND AGRICULTURAL AND MECHANICAL COLLEGE, Baton Rouge, LA (US)

(72) Inventors: Lu Peng, Baton Rouge, LA (US); Ashok Srivastava, Baton Rouge, LA (US); Shaoming Chen, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 331 days.

(21) Appl. No.: 14/737,397

(22) Filed: Jun. 11, 2015

(65) Prior Publication Data

US 2015/0363345 A1     Dec. 17, 2015

Related U.S. Application Data

(60) Provisional application No. 62/011,216, filed on Jun. 12, 2014.

(51) Int. Cl.
*G06F 13/00* (2006.01)
*G06F 12/0862* (2016.01)
(Continued)

(52) U.S. Cl.
CPC ........ *G06F 12/0862* (2013.01); *G06F 13/409* (2013.01); *G06F 13/4072* (2013.01); *G06F 13/1668* (2013.01)

(58) Field of Classification Search
USPC .................. 710/300, 104–110, 116, 309
See application file for complete search history.

(56) References Cited

U.S. PATENT DOCUMENTS

| | | | | |
|---|---|---|---|---|
| 7,325,101 B1* | 1/2008 | Iacobovici | ......... | G06F 12/0897 711/133 |
| 8,112,581 B1* | 2/2012 | Agarwal | ............ | G06F 12/0811 711/112 |

(Continued)

OTHER PUBLICATIONS

"Genus Synthesis Solution." EDA Tools and IP for System Design Enablement, www.cadence.com/content/cadence-www/global/en_US/home/tools/digital-design-and-signoff/synthesis/genus-synthesis-solution.html.

(Continued)

*Primary Examiner* — Raymond Phan
(74) *Attorney, Agent, or Firm* — Jason P. Mueller; Adams and Reese LLP

(57) ABSTRACT

Embodiments of the present invention include methods for increasing off-chip bandwidth. The method includes designing a circuit of switchable pins, replacing a portion of allocated pins of a processor with switchable pins, connecting the processor to a memory interface configured to switch the switchable pins between a power mode and a signal mode, providing a metric configured to identify which of the power mode and the signal mode is most beneficial during 1 millisecond intervals, and switching the switchable pins to signal mode during intervals where the signal mode provides more benefit than the power mode.

15 Claims, 10 Drawing Sheets

(51) Int. Cl.
G06F 13/40 (2006.01)
G06F 13/16 (2006.01)

(56) References Cited

U.S. PATENT DOCUMENTS

| | | | | |
|---|---|---|---|---|
| 8,195,888 B2* | 6/2012 | Solihin | ............... | G06F 12/0862 |
| | | | | 711/129 |
| 8,615,633 B2* | 12/2013 | Solihin | ............... | G06F 12/0831 |
| | | | | 711/122 |
| 2010/0241811 A1* | 9/2010 | Solihin | ............... | G06F 12/0862 |
| | | | | 711/137 |
| 2011/0289256 A1* | 11/2011 | Bartlett | ............... | G06F 12/0844 |
| | | | | 711/3 |
| 2013/0111156 A1* | 5/2013 | Vaduvatha | ............ | G06F 13/409 |
| | | | | 711/154 |

OTHER PUBLICATIONS

"Hardware and Layout Design Considerations for DDR3 SDRAM Memory Interfaces", Freescale Semiconductor, Document No. AN3940, Rev. 6, Nov. 2013, http://www.freescale.com/files/32bit/doc/app_note/AN3940.pdf.

"Standard Technology PCBs." Standard Technology PCB Specification/Specs | Minimum Thickness 0.025 | Sierra Circuits, www.protoexpress.com/content/stcapability.jsp.

Intel. "Pin—A Dynamic Binary Instrumentation Tool." Intel® Software, Intel, Feb. 11, 2018, software.intel.com/en-us/articles/pin-a-dynamic-binary-instrumentation-tool.

Ahn et al., "Future Scaling of Processor-Memory Interfaces", SC09, Nov. 14-20, 2009, Portland, Oregon, USA.

Bitirgen et al., "Coordinated Management of Multiple Interacting Resources in Chip Multiprocessors: A Machine Learning Approach", IEEE, 2008, pp. 318-329.

Black et al., "The gem5 Simulator", ACM SIGARCH Computer Architecture News, vol. 39, No. 2, May 2011, pp. 1-7.

Chen et al., "Coordinating Processor and Main Memory for Efficient Server Power Control", ICS'11, May 31-Jun. 4, 2011, Tucson, Arizona, USA, pp. 130-140.

Dehaven et al., "Controlled Collapse Chip Connection (C4)—An Enabling Technology", IEEE, 1994, pp. 1-6.

Deng et al., "CoScale: Coordinating CPU and Memory System DVFS in Server Systems", IEEE, 2012, ACM 45th International Symposium on Microarchitecture, pp. 143-154.

Iacobovici et al., "Effective Stream-Based and Execution-Based Data Prefetching", ICS'04, Jun. 26-Jul. 1, 2004, Saint-Malo, France.

Ipek et al., "Self-Optimizing Memory Controllers: A Reinforcement Learning Approach", IEEE, 2008, International Symposium on Computer Architecture, pp. 39-50.

Kim et al., "A Case for Exploiting Subarray-Level Parallelism (SALP) in DRAM", IEEE, 2012, pp. 368-379.

Li et al., "McPAT: An Integrated Power, Area, and Timing Modeling Framework for Multicore and Manycore Architectures", MICRO'09, Dec. 12-16, 2009, New York, New York, USA, pp. 469-480.

Ma et al., "Scalable Power Control for Many-Core Architectures Running Multi-threaded Applications", ISCA'11, Jun. 4-8, 2011, San Jose, California, USA, pp. 449-460.

Malladi et al., "Towards Energy-Proportional Datacenter Memory with Mobile DRAM", ISCA'12, Jun. 9-12, 2012, Portland, Oregon, USA.

Leverich et al., "Power Management of Datacenter Workloads Using Per-Core Power Gating", IEEE Computer Architecture Letters, col. 8, No. 2, Jul.-Dec. 2009, pp. 48-51.

Micron Corporation, "2 Gb: x4, x8, x16 DDR3 SDRAM Features", 2006.

Mutlu et al., "Stall-Time Fair Memory Access Scheduling for Chip Multiprocessors", IEEE, 2007, 40th IEEE/ACM International Symposium on Microarchitecture, pp. 146-158.

Mutlu et al., "Parallelism-Aware Batch Scheduling: Enhancing both Performance and Fairness of Shared DRAM Systems", ISCA, 2008.

Qureshi et al., "A Case for MLP-Aware Cache Replacement", ISCA '06, pp. 1-11.

Rogers et al., "Scaling the Bandwith Wall: Challenges in and Avenues for CMP Scaling", ISCA '09, Jun. 20-24, 2009, Austin, Texas, USA, pp. 371-382.

"Standard Performance Evaluation Corporation." SPEC CPU® 2006, www.spec.org/cpu2006/.

Snavely et al., "Symbiotic Jobscheduling for a Simultaneous Multithreading Processor", ASPLOS 2000, Nov. 12-15, 2000, Cambridge, Massachusetts, USA, pp. 234-244.

Tierno et al., "A DPLL-based per Core Variable Frequency Clock Generator for an Eight-Core POWER7 Microprocessor", IEEE, 2010, Symposium on VLSI Circuits/Technical Digest of Technical Papers, pp. 85-86.

Son et al., "Reducing Memory Access Latency with Asymmetric DRAM Bank Organizations", ISCA'13, Tel Aviv, Israel, pp. 380-391.

Udipi et al., "Rethinking DRAM Design and Organization for Energy-Constrained Multi-Cores", ISCA'10, Jun. 19-23, 2010, Saint-Malo, France.

Yoon et al., "BOOM: Enabling Mobile Memory Based Low-Power Server DIMMs", IEEE, 2012, pp. 25-36.

Zheng et al., "Decoupled DIMM: Building High-Bandwidth Memory System Using Low-Speed DRAM Devices", ISCA'09, Jun. 20-24, 2009, Austin, Texas, USA, pp. 255-266.

Zheng et al., "Mini-Rank: Adaptive DRAM Architecture for Improving Memory Power Efficiency", IEEE, 2008, pp. 210-221.

* cited by examiner

MODE SWITCHING FOR INCREASED OFF-CHIP BANDWIDTH

CROSS-REFERENCE TO RELATED APPLICATIONS

This application claims the benefit of U.S. Provisional Patent Application No. 62/011,216, filed on Jun. 12, 2014, which is incorporated herein by reference.

STATEMENT OF GOVERNMENT SUPPORT

This invention was made with government support under contract number CCF-1422408 awarded by the National Science Foundation. The U.S. government has certain rights in the invention.

FIELD

The present invention relates to apparatuses and methods of increasing memory bandwidth available to computer processors, and in particular though non-limiting embodiments, to a switchable pin design and a memory controller that dynamically increases off-chip bandwidth for memory-intensive workloads of a multi-core processor.

BACKGROUND

Off-chip memory bandwidth has been considered one of the major limiting factors to processor performance, especially for multi-cores and many-cores. Conventional processor design allocates a large portion of off-chip pins to deliver power, leaving a small number of pins for processor signal communication. Generally, a processor requires much less power than can be supplied during memory intensive stages. This is due to the fact that the frequencies of processor cores waiting for data to be fetched from off-chip memories can be scaled down in order to save power without degrading performance.

As memory-intensive applications such as web servers, database software, and tools for data analysis predominate, the focus of computer architects has shifted from Instruction Level Parallelism (ILP) to Memory Level Parallelism (MLP). The term "Memory Wall" was coined to describe the disparity between the rate of core performance improvement and the relatively stagnant rate of off-chip memory bandwidth increase. Additional cores, when integrated on the same die, and supplemental applications serve to widen this gap, since each individual core may generate substantial memory requests that need to be queued and served by the memory subsystem. Obviously, the capability of the off-chip memory system largely determines the per-core or even the overall performance of the entire system. In scenarios where the off-chip memory is insufficiently fast to handle all memory transactions in a timely manner, the system performance is highly likely to be bottlenecked by the slow memory accesses.

Several studies have proposed to physically alter the main memory in a Dynamic Random Access Memory (DRAM)-based memory system to improve performance and energy efficiency. One study proposed setting the bus frequency higher than the DRAM module to improve channel bandwidth where the induced bandwidth mismatch is resolved by a synchronization buffer inside the Dual In-line Memory Module (DIMM) for data and command. Other studies have explored using low power double data rate (LPDDR2) memory in place of conventional DDR3, due to its higher energy efficiency.

To reduce the delay of bank access, and thereby increase memory bandwidth, architects have optimized the memory system at the rank and bank level. One study subdivided conventional ranks into mini-ranks with a shorter data width. These mini-ranks can be operated individually via a small chip on each DIMM for higher DRAM energy efficiency. Rank sub-setting is also proposed to improve the reliability and performance of a memory system.

Inside a DRAM bank, increasing the row buffer hit ratio may also improve energy efficiency and performance. One study partitioned a row buffer into multiple sub-arrays inside a bank to reduce the row buffer miss rate. An asymmetric DRAM bank organization can be used to reduce the bank access latency and improve the system performance.

Some studies have already stressed the significance of off-chip bandwidth. To increase the overall energy efficiency of a memory system, one study split a 64 bit data bus into eight 8 bit data buses reducing the queue delay at the expense of data transfer delay. Another study designed a memory scheduler using principles of reinforcement learning to understand program behaviors and boost performance. Yet another study focused on boosting multi-threaded performance by providing fair DRAM access for each thread in their memory scheduler.

Architects have employed several sophisticated methods to balance core and memory performance; however, few of them have been able to increase the off-chip bandwidth beyond the constraint of static pin allocation.

Therefore, a long-standing, but unmet, need exists for apparatuses and methods for increasing off-chip bandwidth beyond static pin allocation, to mitigate the shortage of off-chip bandwidth during the memory-intensive phases of program executions, in order to improve performance of processors, including multi-core processors, during memory-intensive tasks. The present invention satisfies this need.

SUMMARY

Embodiments of the present invention provide for a pin switching method to alleviate the shortage of off-chip bandwidth, whereby pins may be dynamically allocated for power delivery or signal transmission with minimal changes to the circuit. By accurately identifying memory-intensive phases at runtime, embodiments of the present invention may convert a portion of the pins used for power delivery to signal transmission mode, thereby providing additional off-chip bandwidth and improving the overall performance of the system. The method includes techniques such as Dynamic Switching and stride prefetching configured to significantly accelerate program execution.

In an embodiment of the present disclosure, a method of increasing off-chip bandwidth is provided. The method includes designing a circuit having switchable pins, replacing a portion of allocated pins of a processor with the switchable pins, connecting the processor to a memory interface configured to dynamically switch the switchable pins between a power mode and a signal mode, providing a metric configured to identify which of the power mode and the signal mode is most beneficial during a 1 millisecond interval, and switching the switchable pins to signal mode during intervals where the signal mode provides more benefit than the power mode. The method includes utilizing cache block prefetching techniques to amplify benefits of the switchable pins. The method includes utilizing an off-chip bus connection to switch from a multi-bus mode to a single-bus mode and vice-versa. The method includes allocating not more than three additional buses via pin switching.

The circuit provided for in the method includes a first circuit having a signal-to-power switch and a first set of five stage tri-stage buffers connected to the signal-to-power switch, wherein the first set of five stage tri-stage buffers are placed in signal lines to amplify I/O signals to compensate for parasitic capacitances of the signal-to-power switch, a second circuit having a signal switch and a second set of five stage tri-stage buffers connected to the signal switch, wherein the second set of five stage tri-stage buffers enable memory devices that can be accessed via buses, and a third circuit having a signal buffer, wherein the signal-to-power switch allows for the switchable pins to alternate between the multi-bus and single-bus mode, wherein the signal switch ensures that data in the memory interface can be accessed in the multi-bus and single-bus modes, wherein both the signal-to-power switch and signal switch are configured to route signals and power in the multi-bus and single-bus modes, wherein the signal buffer amplifies the I/O signals in order to offset effects of parasitic capacitance. The multi-bus mode includes N number of buses connected to private DRAM interfaces via individual buses and the single-bus mode includes a single bus connected to a private DRAM interface.

The method includes using a memory controller to assist in switching between the multi-bus and single-bus modes. The memory controller includes a front arbiter, N dedicated request queues configured to individually receive incoming requests from the front arbiter, and an end arbiter that fetches requests residing in the queues, wherein the requests may be fed via corresponding DRAM interfaces into corresponding DIMMs while in the multi-bus mode, wherein the requests may be fed via a single DRAM interface into attached DIMMs as appended ranks while in the single-bus mode. The method includes employing XOR banking indexing to reduce row-buffer conflicts. The method further includes analyzing signal integrity to demonstrate feasibility in the multi-bus and single-bus modes.

The metric provided for in the method is switching benefit, $B_{ij}(T_c)$, wherein $B_{ij}(T_c)$ represents the estimated reward for running the interval following time $T_c$ in mode j instead of mode i. The switching benefit, $B_{ij}(T_c)$, is calculated using the following equation: $B_{ij}(T_c)=\Sigma_{k=1}^{P}(WS_{j,k}(T_c)-WS_{i,k}(T_c))$, wherein $WS_{i,k}(T_c)$ and $WS_{j,k}(T_c)$ are estimated weighted speedups for program k at time $T_c$ in mode i and mode j respectively, and p is the number of simultaneously executing programs. Based on a history of the switching benefit, $B_{ij}(T_c)$, $\tilde{B}_{ij}(T_c)$ may be predicted as a switching benefit for a following interval using the equation: $\tilde{B}_{ij}(T_c)=\Sigma_{k=1}^{N}B_{ij}(T_c-k*T_{interval})$, wherein $B_{ij}(T_c-k*T_{interval})$ represents switching benefit, $B_{ij}(T_c)$, and may be measured from N intervals ago. The method includes staying in mode if the predicted switching benefit, $\tilde{B}_{ij}(T_c)$, is negative, and switching to mode j if the predicted switching benefit, $\tilde{B}_{ij}(T_c)$, is positive. The weighted speedup is calculated using the following equation:

$$\text{Weighted Speedup} = \sum_{i=0}^{n-1} \frac{1/T_i^{Shared}}{1/T_i^{Alone}},$$

wherein $T_i^{Shared}$ and $T_i^{Alone}$ denote an execution time of a single program running alone, and an execution time of a single program running with other programs, respectively.

In an embodiment of the present disclosure, a circuit is provided. The circuit includes switchable pins, a first circuit having a signal-to-power switch and a first set of five stage tri-stage buffers connected to the signal-to-power switch, wherein the first set of five stage tri-stage buffers are placed in signal lines to amplify I/O signals to compensate for parasitic capacitances of the signal-to-power switch, a second circuit having a signal switch and a second set of five stage tri-stage buffers connected to the signal switch, wherein the second set of five stage tri-stage buffers enable memory devices that can be accessed via buses, and a third circuit having a signal buffer, wherein the signal-to-power switch allows for the switchable pins to alternate between a multi-bus mode and single-bus mode, wherein the signal switch ensures that data in the memory interface can be accessed in the multi-bus and single-bus modes, wherein both the signal-to-power switch and signal switch are configured to route signals and power in the multi-bus and single-bus modes, wherein the signal buffer amplifies the I/O signals in order to offset effects of parasitic capacitance. The switchable pins are configured to switch between a power mode and a signal mode.

In an embodiment of the present disclosure, a memory controller is provided. The memory controller includes a front arbiter, N dedicated request queues configured to individually receive incoming requests from the front arbiter, and an end arbiter that fetches requests residing in the queues, wherein the requests may be fed via corresponding DRAM interfaces into corresponding DIMMs while in a multi-bus mode, wherein the requests may be fed via a single DRAM interface into attached DIMMs as appended ranks while in a single-bus mode. The memory controller is configured to assist in switching between the multi-bus and single-bus modes.

DETAILED DESCRIPTION

Embodiments of the present invention provide for methods and apparatuses to mitigate shortage of off-chip bandwidth during the memory-intensive phases of program executions, thereby enhancing overall performance of a memory system—a pressing issue for memory systems in the multi-core era. Embodiments of the present invention include a switchable pin design and accurate identifications of memory-intensive phases. Pins may be dynamically altered for power delivery or signal transmission via accessory circuits. These circuits may enable the pins to deliver quality power or signals with relatively low area overhead. In embodiments of the present invention, memory intensive phases may be identified by observing key performance metrics at runtime. Extra off-chip bandwidth is demanding in phases with high memory intensity. By switching the pins and providing additional bandwidth for off-chip memory transactions, the performance of memory-intensive stages may be boosted, thus impressively accelerating overall execution.

In embodiments of the present invention, an improved method of adding additional buses to multiply off-chip bandwidth is provided, which focuses on memory schedulers and bus control. In embodiments of the present invention, off-chip memory bandwidth is increased by including more memory channels.

In embodiments of the present invention, a memory controller is provided that may dynamically increase off-chip bandwidth at the cost of a lower core frequency, thereby significantly increasing throughput for memory-intensive workloads with only a slight hardware overhead. Embodiments of the present invention further provide for a switchable pin design converts a power pin to a signal pin or vice-versa. In exemplary embodiments of the present invention, a Dynamic Switching method is provided to alleviate negative side-effects of pin switching by actively identifying memory-intensive phases and only switching when the condition is satisfied.

Embodiments of the present invention provide for improved designs that boost computer system performance, especially for memory-intensive programs. In conventional designs, performances during these workloads are degraded by a shortage of memory buses, which limits off-chip bandwidth. Embodiments of the present invention provide for increased memory bandwidth, thereby reducing average latency of off-chip memory access, at the expense of a lower core frequency. Rather than retaining a fixed number of buses connected to the DRAM (typically one bus per channel), embodiments of the present invention provide for designs configured to dynamically switch buses between signal and power pins (VDD or GND) to reduce latency for these workloads, referred to herein as "multi-bus mode", as opposed to "single-bus mode", which is similar to conventional processor operation. The switchable pins may facilitate changing between these two modes.

Figure 1:
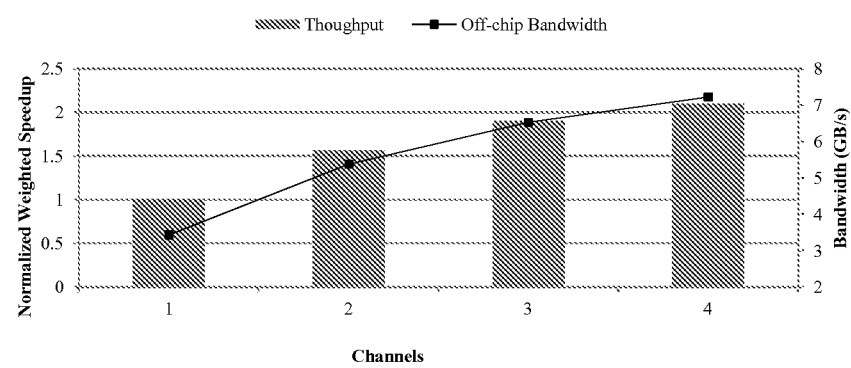
FIG. 1 is a chart depicting increased off-chip memory bandwidth by including more memory channels, according to an exemplary embodiment of the present invention.

Referring now to FIG. 1, a chart depicting increased off-chip memory bandwidth by including more memory channels is shown. Specifically, in an exemplary embodiment, FIG. 1 illustrates a variation of normalized throughput with the number of memory channels increased from 1 to 4 when 4 lbm programs are running on an X86 platform. As shown in the figure, including more memory channels significantly increases off-chip bandwidth, which in turn translates to an impressive boost of system performance. Furthermore, compared to compute-intensive stages, processors may consume much less power during memory-intensive phases when cores wait for data to be fetched from main memory.

Figure 2A:
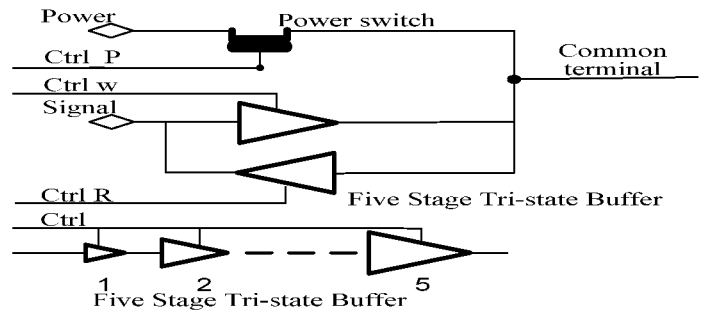
FIG. 2A is a schematic of a circuit of a signal-to-power switch, according to an exemplary embodiment of the present invention.
Figure 2B:
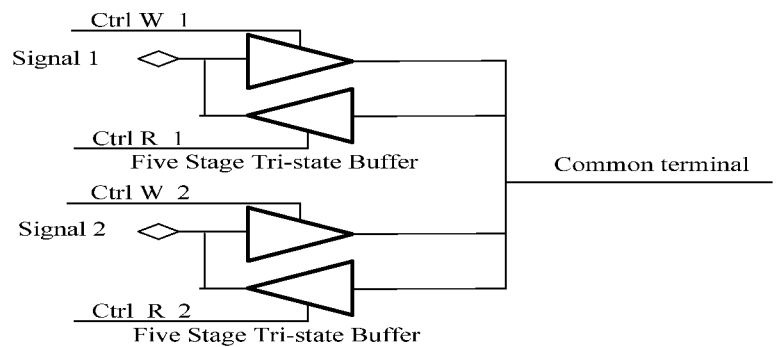
FIG. 2B is a schematic of a circuit of a signal switch, according to an exemplary embodiment of the present invention.
Figure 2C:
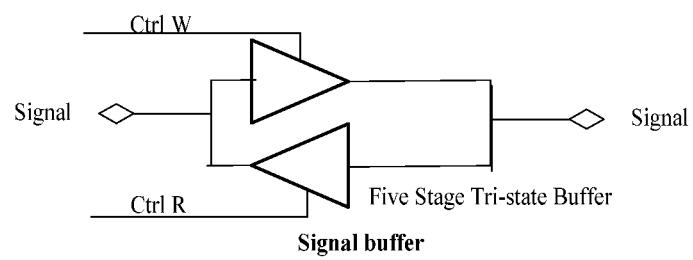
FIG. 2C is a schematic of a circuit of a signal buffer, according to an exemplary embodiment of the present invention.

FIG. 2 depicts several schematics of two switches and a signal buffer, which may serve as basic units for exchanging power pins for signal pins. FIG. 2A is a schematic of a circuit of a signal-to-power switch. FIG. 2B is a schematic of a circuit of a signal switch. FIG. 2C is a schematic of a circuit of a signal buffer. Referring to FIG. 2A, the signal-to-power switch may allow for a regular pin to alternate between the multi-bus and single-bus modes. In an exemplary embodiment, a dedicated power switch may be provided which may sit on a power delivery path to minimize corresponding IR drop and power consumption with its ultra-low switch-on resistance, measuring as low as 1.8 mΩ. While in the single-bus mode, the power switch may be turned on while two 5 stage tri-state buffers on the signal line are turned off. In other embodiments, the power switch may be turned off to block noisy interference from a power line, and the tri-state buffers may be turned on in one direction according to whether data is read from the memory or written by a memory controller. To compensate for parasitic capacitances of the power switch, the 5 stage tri-state buffers may be placed in signal lines to amplify I/O signals. The buffer size may be increased between each stage to amplify the signal with small delay. In exemplary embodiments, the buffer size is increased by four times. In a particular embodiment, the 5 stage tri-state buffer may incur a total 0.9 ns delay. On the other hand, the die area of the power switch may be commensurate to that of 3,000 traditional transistors. The number of signal pins for a DRAM bus may slightly vary depending on different processors (e.g. with or without ECC). For example, 125 power switches per bus may be used, which may consist of 64 data pins and 61 address and command pins from a pin allocation of an i5-4670 Intel Processor. The total die area may consume 375,000 (3,000× 125) traditional transistors. Therefore, considering a billion-transistor chip, the area overhead for the 3 buses may be less than 0.12% of the total chip area.

In embodiments of the present invention, the signal switch shown in FIG. 2B may be employed to ensure that data in the DRAM can be accessed in two modes. In exemplary embodiments, the signal switch utilizes two pairs of 5 stage tri-state buffers to enable memory devices that can be accessed via two buses. The buffers, identical to those used in the signal-to-power switch, may resist noise from a channel when the other channel is selected. In embodiments, the signal buffers shown in FIG. 2C may also be utilized due to their strong peak-drive current and sink capabilities. The signal buffers may be utilized to amplify the signal in order to offset the effect of the parasitic capacitance.

Generally, processors may possess specific pin allocations depending on the package, power consumption, and hardware interface (the number of memory channels). In an exemplary embodiment, a pin allocation of an i5-4670 Intel Processor is used. Table 1 shows a pin allocation of an Intel processor i5-4670.

TABLE 1

| $V_{DD}$ | GND | DDR3 | Others | Total |
|---|---|---|---|---|
| 153 | 475 | 250 | 272 | 1150 |

While this processor includes 4 cores and 2 memory channels, 54.6% of the pins may be used for power delivery. Out of the 628 power pins (54.6%×1150), 125 of these may be replaced with switchable pins for a single bus. To maintain the same ratio of VDD to GND pins, 30 of the 125 switchable pins may be allocated as VDD pins and the remaining 95 as GND pins. In embodiments, a maximum of three additional buses may be allocated via pin switching because adding more may lead to a considerable drop in performance.

Embodiments of the present invention provide for an improved design of a memory interface configured to take the advantage of the switchable pins to dynamically increase off-chip bandwidth. In exemplary embodiments, an off-chip bus connection and instructions to configure the switchable pins for power delivery or for signal transmission is provided.

Figure 3:
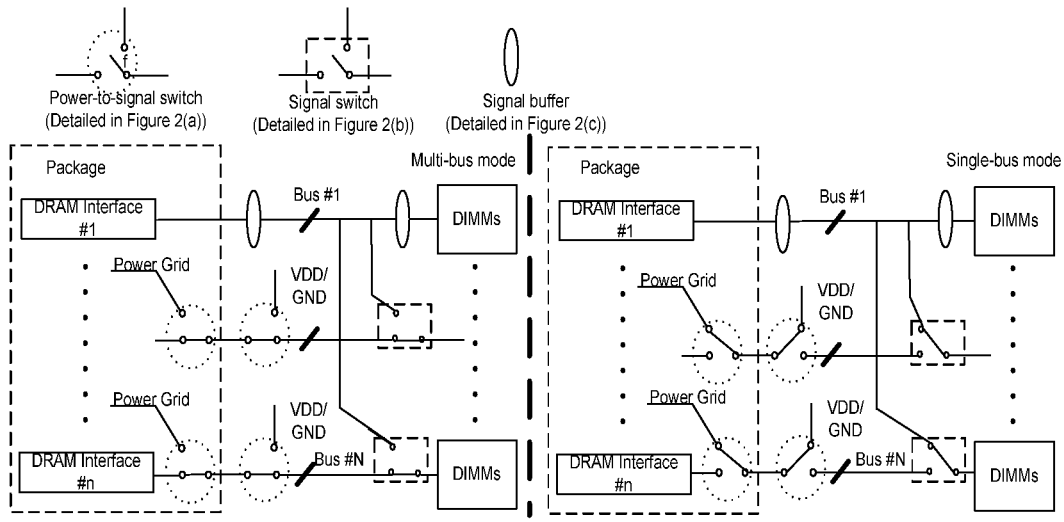
FIG. 3 is a schematic of a hardware design for an off-chip bus connection, according to an exemplary embodiment of the present invention.

Referring to FIG. 3, a schematic of a hardware design for an off-chip bus connection is shown. The off-chip bus connection is configured to switch between the multi-bus mode and the single-bus mode. In the multi-bus mode, several buses (assuming N) may be connected to private DRAM interfaces via the individual buses. On the other hand, the single-bus mode may only access DRAM by a single bus. In embodiments, two signal-to-power switches and a signal switch for each signal wire of N−1 buses may be used. In exemplary embodiments, the switchable pins are configured for signal transmission by the signal-to-power switches where the signal switches connect the bus to DRAM devices in the multi-bus mode. In alternative embodiments, the switchable pins may be configured for power delivery where the DRAM devices are connected to the shared bus.

In embodiments of the present invention, the signal-to-power switch detailed in FIG. 2A and the signal switch detailed in FIG. 2B may be controlled to route signal and power in the two modes. The signal to the DRAM interface may be divided into two groups: command signals and data signals (DQ). The command signals running in one direction may be routed via the two switches which only need one direction buffer instead of a pair. The DQ may be bi-directional and the switches shown in FIG. 3 may receive and send signals in both directions.

For the placements of the switches on a printed circuit board (PCB), one signal-to-power switch for each signal line may be placed close to the processor package in order to shorten the signal wire which has to bear high current for power delivery. To avoid signal reflections caused by an impedance mismatch, the width of the signal wires may be maintained and an experiment conducted to test the feasibility of high current via these signal wires. On the other hand, the signal switch may be placed near the corresponding DRAM device to reduce signal reflections.

Figure 4:
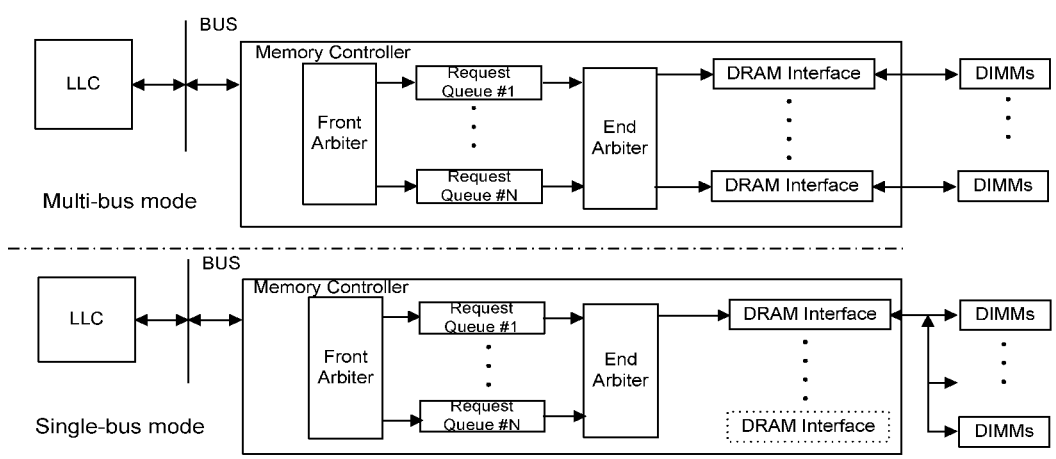
FIG. 4 is a schematic of a hardware design for a memory controller, according to an exemplary embodiment of the present invention.

Referring to FIG. 4, a schematic of a hardware design for a memory controller is shown. In embodiments, the memory controller may be configured for switching between the multi-bus and single-bus modes. A primary concern in these embodiments relate to data availability of the memory controller. All the available memory buses in the multi-bus mode may be fully utilized to achieve maximum bandwidth while still allowing all the data in single-bus mode to be accessed. Generally, due to the complicated synchronization of memory requests between memory controllers, the switch between the two modes may only implemented inside the memory controller. Within a memory controller, a memory interface may be designed and/or configured for each bus to fully exploit benefits of the multi-bus mode without interference of traffic from other buses compared to a design of multiple buses sharing a single memory interface.

In embodiments of the present invention, the memory controller may include dedicated request queues (Request Queue #1 . . . Request Queue #N) which may buffer the incoming requests to the buses shown in FIG. 4. The queues individually receive requests from a front arbiter, which then employ its address mapping policy when dispatching requests. Once the requests are residing in the queues, they are fetched by a back/end arbiter. While in the multi-bus mode, the requests are fed into their corresponding buses via corresponding DRAM interfaces. Because memory interfaces may operate independently and in parallel, memory bandwidth may be amplified by a factor of a number of memory buses. In the single-bus mode, the memory controller may work similar to a conventional processor and communicate with the attached DIMMs as appended ranks.

In embodiments of the present invention, the circuit overhead includes a front arbiter, an end arbiter, and extra DRAM interfaces. As a result of both arbiters, the cost of dispatching requests without buffering is negligible. Furthermore, the cost of the additional DRAM interface is inexpensive. The estimated net area of a typical DRAM interface from Opencore is 5,134 µm2 in 45 nm technology. This estimation was conducted by the Encounter RTL Compiler with the NanGate Open Cell Library. The maximum of three additional buses used in embodiments of the invention may create a maximum hardware overhead of less than 0.00015 cm$^2$, which is significantly less than the typical 1 cm$^2$ die area.

In embodiments of the present invention, data accesses may interleave at a page level via different buses exploiting the benefit of memory-level parallelism while maintaining a high row buffer hit ratio. On the other hand, interleaving at the block level may considerably decrease the row buffer hit ratio resulting in longer off-chip latency per request and extended queue delay. In exemplary embodiments, XOR banking indexing is employed to reduce row-buffer conflicts, which may effectively reduce bank conflicts resulting from resource-contention-induced traffic and write-backs. This permutation may distribute blocks stored in the last level cache into different banks as opposed to possibly including tags of physical addresses containing the same bank index.

Figure 5A:
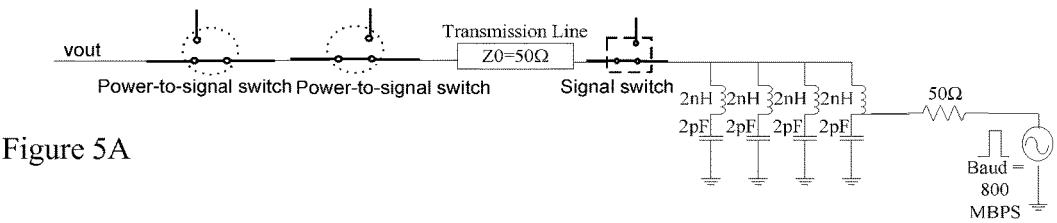
FIG. 5A is a schematic of a spice model for a device to controller in multi-bus mode, according to an exemplary embodiment of the present invention.
Figure 5B:
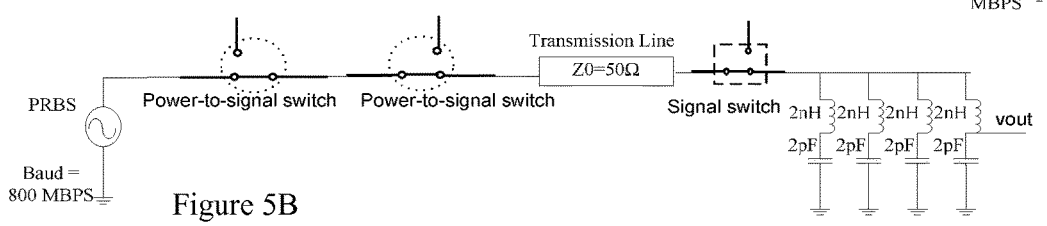
FIG. 5B is a schematic of a spice model for a controller to device in multi-bus mode, according to an exemplary embodiment of the present invention.
Figure 5C:
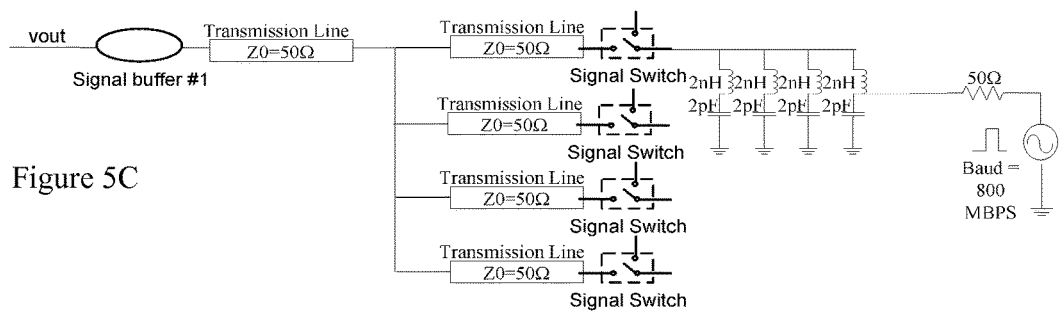
FIG. 5C is a schematic of a spice model for a device to controller in single-bus mode, according to an exemplary embodiment of the present invention.
Figure 5D:
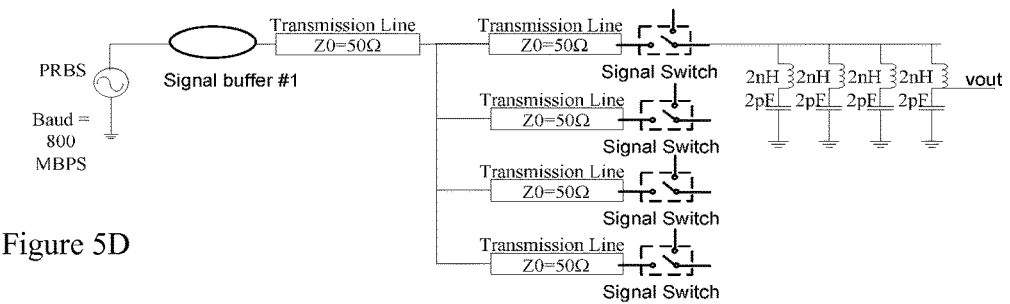
FIG. 5D is a schematic of a spice model for a controller to device in single-bus mode, according to an exemplary embodiment of the present invention.
Figure 6A:
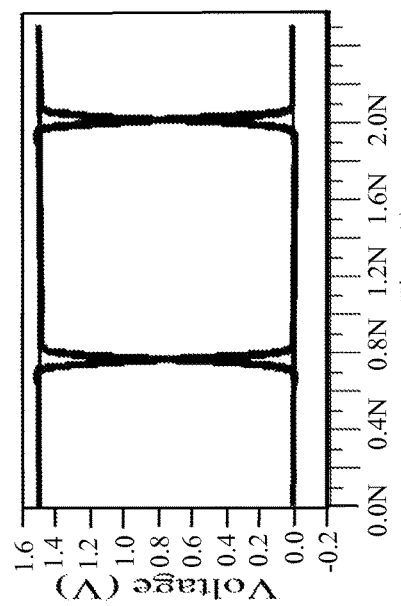
FIG. 6A is a data signal read in multi-bus mode (Device to Controller), according to an exemplary embodiment of the present invention.
Figure 6B:
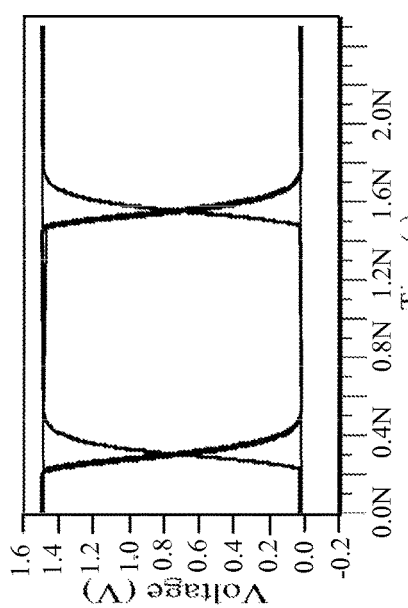
FIG. 6B is a data signal written in multi-bus mode (Controller to Device), according to an exemplary embodiment of the present invention.
Figure 6C:
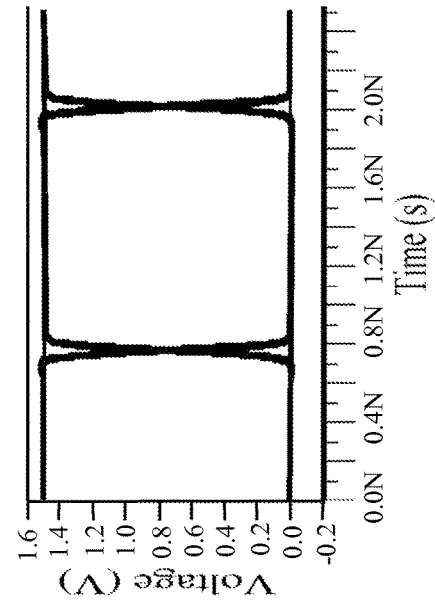
FIG. 6C is a data signal read in single-bus mode (Device to Controller), according to an exemplary embodiment of the present invention.
Figure 6D:
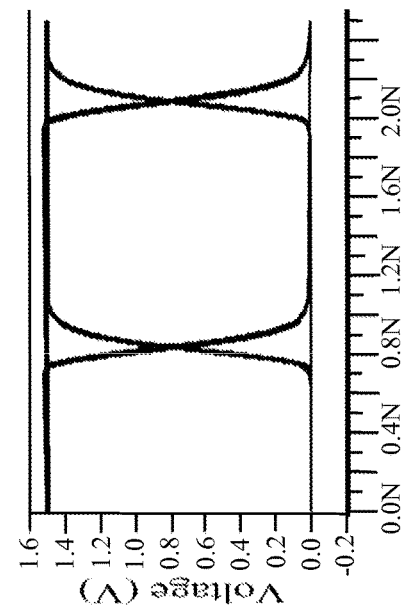
FIG. 6D is a data signal written in single-bus mode (Controller to Device), according to an exemplary embodiment of the present invention.

In embodiments of the present invention, signal integrity may be analyzed to demonstrate feasibility in the multi-bus and single-bus modes. Referring to FIG. 5, schematics of spice models for signal integrity simulation are shown. In particular, FIG. 5 shows simulated SPICE models of the accessory circuit, PCB transmission lines, bond wire inductance, and driver capacitance associated with the device package in the AMS packages of Mentor Graphic. FIG. 5(a) is a schematic of a device to controller in multi-bus mode. FIG. 5(b) is a schematic of a controller to device in multi-bus mode. FIG. 5(c) is a schematic of a device to controller in single-bus mode. FIG. 5(d) is a schematic of a controller to device in single-bus mode. Signal integrity challenges are alleviated since the DDR3 command signal is unidirectional and its speed may be no more than that of the data signals.

FIG. 6 depicts several examples of data signals/eye patterns of writing data (controller to device) and reading data (device to controller) in the two modes as derived from the corresponding SPICE models shown in FIG. 5. FIG. 6A is a data signal read in multi-bus mode (Device to Controller). FIG. 6B is a data signal written in multi-bus mode (Controller to Device). FIG. 6C is a data signal read in single-bus mode (Device to Controller). FIG. 6D is a data signal written in single-bus mode (Controller to Device). As shown, embodiments depict clear eyes since the signal-to-power switch alleviates the effect of the parasitic capacitance of the power switches. Furthermore, the signal switches and signal buffers alleviate signal reflections caused by discontinuities—thereby indicating that the accessory circuit may maintain signal quality in the two modes.

Figure 7A:
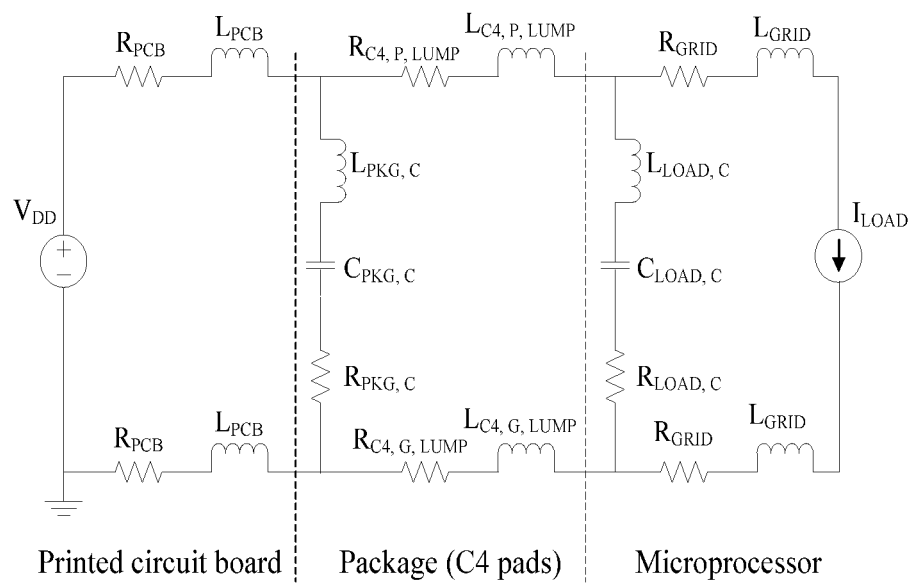
FIG. 7A is a schematic of a power delivery network (PDN), according to an exemplary embodiment of the present invention.
Figure 7B:
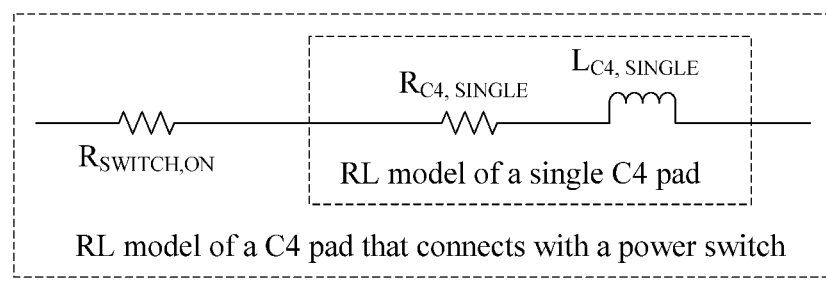
FIG. 7B is a schematic of an RL model of Controlled Collapse Chip Connection (C4) pads, according to an exemplary embodiment of the present invention.

Embodiments of the present invention require an assessment of the repercussions experienced by a power delivery network (PDN) when the switchable pins are shifted from single-bus mode to multi-bus mode. FIG. 7 shows schematics of an RLC power delivery model. FIG. 7A is a schematic of a PDN. FIG. 7B is a schematic of an RL model of Controlled Collapse Chip Connection (C4) pads in which the resistance of on-state power switches is taken into consideration. In embodiments, the power delivery path may be modeled with RL components (i.e. resistors and inductors) connected in series across the PCB, the package, and the silicon die. In exemplary embodiments, decoupling capacitors may be introduced between each individual PDN to control any voltage fluctuations. The on-chip power grids and processor circuits on the silicon die may be modeled separately as RL components with an ideal current source. Table 2 lists several existing power network model parameter values.

TABLE 2

| Resistance | Value | Inductance | Value |
|---|---|---|---|
| $R_{PCB}$ | 0.015 mΩ | $L_{PCB}$ | 0.1 nH |
| $R_{PKG,C}$ | 0.2 mΩ | $L_{PKG,C}$ | 1 pH |
| $R_{LOAD,C}$ | 0.4 mΩ | $L_{LOAD,C}$ | 1 fH |
| $R_{GRID}$ | 0.01 mΩ | $L_{GRID}$ | 0.8 fH |
| $R_{C4,SINGLE}$ | 40 mΩ | $L_{C4,SINGLE}$ | 72 pH |
| $R_{SWITCH,ON}$ | 1.8 mΩ | | |
| Capacitance | | | |
| $C_{PKG,C}$ | 250 µF | $C_{LOAD,C}$ | 500 nF |

In example embodiments, PDN simulations were performed in PSPICE to evaluate the impact of Pin Switching. Due to resistance along the power delivery path, an IR drop may exist between the supply voltage and load voltage as current flows through the PDN. Assuming a normalized IR drop should be upper-bounded by 5%, maximum currents may be 125 A, 104 A, 80 A, and 56 A for the baseline, and then for Pin Switching mechanisms with one, two, and four borrowed buses respectively. In other words, the three Pin Switching diagrams may switch 125, 250, and 375 power pins to signal pins providing 16.8%, 36.0%, and 55.2% less current with 19.9%, 39.8% and 59.7% less power pins respectively. The percentage of current decrease is less than that of proportional power pin quantity decrease because the IR drop depends on the resistance in the PCB and power grids.

In embodiments of the present invention, assuming the processor employs a dynamic voltage and frequency scaling (DVFS) mechanism supporting 4 voltage and frequency operating points, a frequency may be scaled down from 4.0 GHz to 1.2 GHz. Correspondingly, the voltage may be decreased from 1.0V to 0.64V. According to McPAT (Multicore Power, Area, and Timing), an integrated power, area, and timing modeling framework for multithreaded, multicore, and manycore architectures, the baseline design may work at a frequency of 4.0 GHz given the power delivery information. However, the processor frequency must be decreased individually to 3.2 GHz, 2.4 GHz, and 1.2 GHz when the power pins for one, two, and three sets of memory channel pins are borrowed as I/O pins respectively. Table 3 lists these processor power and frequency parameters for a different number of buses.

TABLE 3

| BUS | 1 | 2 | 3 | 4 |
|---|---|---|---|---|
| Current (A) | 125 | 104 | 80 | 56 |
| Voltage (V) | 1 | 0.88 | 0.76 | 0.64 |
| Power (W) | 125 | 92 | 61 | 36 |
| Frequency (GHz) | 4 | 3.2 | 2.4 | 1.2 |

In embodiments of the present invention, a predictor to choose the most beneficial mode for the next interval for multi-program workloads is provided. Simply switching based on the amount of consumed off-chip bandwidth may not be sufficient to improve overall performance of a system in which only some of the programs that suffer from long off-chip access latency are likely to benefit from multi-bus mode. To identify intervals that may benefit from Pin Switching, both the performance change of each program, and the overall benefit of switching for the following interval based on the current performance before a switching occurs, may be estimated. In exemplary embodiments of the present invention, a metric called the switching benefit, $B_{ij}(T_c)$, may be utilized to help identify the most beneficial mode for each 1 millisecond interval, where $B_{ij}(T_c)$ represents the estimated reward for running the interval following time $T_c$ in mode j instead of mode i.

In embodiments, based on the history of the switching benefit, $\tilde{B}_{ij}(T_c)$ may be predicted as the switching benefit for the following interval using $\tilde{B}_{ij}(T_c) = \Sigma_{k=1}^{N} B_{ij}(T_c - k*T_{interval})$, where $B_{ij}(T_c - k*T_{interval})$ represents the switching benefits detailed in equation (1) and may be measured from the N intervals ago. N is the length of the history to consider. In exemplary embodiments, N is 2. If the predicted switching benefit is negative, the system will stay in mode i, otherwise, it will switch to mode j.

In exemplary embodiments, the switching benefit may be calculated using the following equation:

$$B_{ij}(T_c) = \Sigma_{k=1}^{p}(WS_{j,k}(T_c) - WS_{i,k}(T_c)) \quad (1)$$

wherein $WS_{i,k}(T_c)$ and $WS_{j,k}(T_c)$ stand for the estimated weighted speedups for program k at time $T_c$ in mode i and mode j respectively, while p represents the number of simultaneously executing programs. In exemplary embodiments, p is 4. The weighted speedup of each program in mode i during the interval may be estimated based on the information derived from hardware counters and off-line profiling, since the system is running in mode during the current interval. The weighted speedup is calculated as follows:

$$WS_{i,k}(T_c) = T_{alone,i,k}(T_c)/T_{shared,i,k}(T_c)$$

$$T_{alone,i,k}(T_c) = \text{Committed Inst}_{alone,k}(T_c)/(\text{averageIPS}_{alone,k})$$

wherein $T_{alone,i,k}(T_c)$ stands for the execution time of the same instructions running without interference from co-runners, and $T_{shared,i,k}(T_c)$ denotes the execution time of a fraction of program k running with others during the current interval which is equal to the length of an interval (1 millisecond). Furthermore, Committed $\text{Inst}_{alone,i,k}(T_c)$ stands for the number of committed instructions during the interval following $T_c$ of program k, directly derived from a hardware counter since it should be identical to the number when program k shares the main memory system with others. Average IPS obtained from off-line profiling denotes the average number of executed Instructions Per Second (IPS) when program k running alone. These values may be used to approximate $T_{alone,i,k}(T_c)$ based on the assumption that the IPS of each program is relatively steady when it runs alone, since an accurate estimation of $T_{alone,i,k}(T_c)$ is challenging.

The estimation of the weighted speedup of each program in currently unused mode j is more difficult compared to that in current mode i, since it is only possible to estimate the performance of mode j according to the information collected in mode i. The weighted speedup is calculated as follows:

$$WS_{j,k}(T_c) = T_{alone,j,k}(T_c)/T_{shared,j,k}(T_c)$$

$$T_{shared,j,k}(T_c) = T_{on-core,j,k}(T_c) + T_{off-core,j,k}(T_c)$$

wherein $T_{alone,j,k}(T_c)$ is identical to $T_{alone,i,k}(T_c)$, and $T_{shared,j,k}(T_c)$ represents the execution time of program k running with others in mode j. It may be divided into two parts based on whether the execution times vary with core frequency: $T_{on-core,j,k}(T_c)$ may denote the portion of the execution time spent inside the core which is inversely proportional to core frequency, while $T_{off-core,j,k}(T_c)$ may express the portion of execution time incurred by activity outside the core. $T_{on-core,j,k}(T_c)$ may be estimated based on the corresponding time $T_{on-core,i,k}(T_c)$ in mode i using:

$$T_{on-core,j,k}(T_c) = T_{on-core,i,k}(T_c) * \text{freq}_{i,k}/\text{freq}_{j,k}$$

where $\text{freq}_{i,k}$ and $\text{freq}_{j,k}$ are the frequencies in mode i and mode j respectively. $T_{on-core,i,k}(T_c)$ may be estimated with the same breakdown using $$T_{on-core,j,k}(T_c) = T_{interval} - T_{off-core,j,k}(T_c)$$

$$T_{off-core,j,k}(T_c) = T_{LLC,i,k}(T_c) + T_{DRAM,i,k}(T_c)$$

where $T_{LLC,i,k}(T_c)$ is the execution time incurred in the shared last level cache (LLC) in mode i, which is estimated using the number of the accesses to LLC, and $T_{DRAM,i,k}(T_c)$ denotes the execution time incurred by activity in the DRAM controller in mode i. $T_{DRAM,i,k}(T_c)$ is the cumulative time spent when there is at least one in-flight read requests in the DRAM controller, since it may avoid the overestimation due to the overlap of multiple in-flight read requests for single thread.

On the other hand, $T_{off-core,j,k}(T_c)$ is mainly affected by the number of buses between different modes since the queue delay inside the DRAM controller may typically decrease as more off-chip buses are added. Time is calculated using:

$$T_{off-core,j,k}(T_c) T_{off-core,i,k}(T_c) + T_{queue\ delay,j,k}(T_c) - T_{queue\ delay,i,k}(T_c)$$

$$T_{queue\ delay,j,k}(T_c) = T_{queue\ delay,i,k}(T_c) * N_{request,j,k}(T_c)/N_{request,i,k}(T_c)$$

where $T_{queue\ delay,i,k}(T_c)$ and $T_{queue\ delay,j,k}(T_c)$ denote the execution time incurred inside the queue of the DRAM controller in modes i and j respectively, while $N_{request,i,k}(T_c)$ and $N_{request,j,k}(T_c)$ stand for the average number of waiting requests per incoming read requests which have to wait until they have been completed in modes i and j. $T_{queue\ delay,i,k}(T_c)$ is estimated by the time when there is at least one read request in the queue of DRAM controller. $T_{queue\ delay,j,k}(T_c)$ is estimated by sampling the number of waiting requests in different modes In embodiments of the present invention, any runtime overhead incurred by switching may come from the DVFS and IR drop fluctuations caused by the pin switch. In exemplary embodiments, the overhead for DVFS is approximately 20 µs and the time for the IR drop to re-stabilize is bounded by approximately 20 µs according to the power delivery simulation. Because both of these delays overlap each other, the estimated total overhead is approximately 20 µs, and is thereby taken into consideration. Therefore, the penalty may be approximately 40 µs when a phase is incorrectly identified. However, the overall switching overhead is still negligible since the average length of the identified phases shown is much longer than the overhead in the workloads. Since most programs only switch a few times during execution, nearly all the program phase transitions have been identified by the predictor.

To evaluate benefits of the present invention, an x86 system was simulated using a Gem5 simulator. Table 4 lists a configuration of the simulated system.

TABLE 4

| Processor | 4 × 86 OoO cores with issue width 4 |
| --- | --- |
| L1 I cache | Private 32 KB, 8 way, 64 B cache line, 2 cycles |
| L1 D cache | Private 32 KB, 8 way, 64 B cache line, 2 cycles |
| L2 Cache | Shared 8 MB, 8 way, 64 B cache line, 20 cycles |
| Memory controller | FR-FCFS scheduling, open row policy |
| Channel | 1 |
| Bus per channel | 2/3/4 (additional buses 1/2/3) |
| Rank per bus | 2 |
| Bank per rank | 8 |
| Bank | 8 × 8 DDR3-1600 chips Parameters of DDR3-1600 from Micron datasheet |

The DRAM model integrated in Gem5 was modified to accurately simulate the proposed method. Throughout the experiments, multi-bus mode utilized all available buses with the corresponding core frequency shown in Table 3. The buses were partially unutilized with a high core frequency between multi-bus and single-bus modes. Off-chip DVFS was employed to maintain the same frequency on all 4 cores at any given time.

In embodiments of the present invention, weighted speedup lists were utilized to represent the throughput of the present invention shown in the following equation:

$$\text{Weighted Speedup} = \sum_{i=0}^{N-1} \frac{1/T_i^{Shared}}{1/T_i^{Alone}}$$

wherein and $T_i^{shared}$ and $T_i^{Alone}$ denote the execution time of a single program running alone and the execution time running with other programs respectively. Because the IPC may be distorted by the frequency change from the employed DVFS, the execution time was used in place of it. Energy per Instruction (EPI) was utilized for the evaluation of energy efficiency. This metric may be obtained from dividing consumed energy by the total number of instructions committed.

Various multi-program workloads consisting of SPEC 2006 benchmarks were used for the evaluation/simulation. The benchmarks were categorized into two separate groups based on their relative memory intensities: memory intensive programs and compute-intensive programs. Table 5 lists the selected memory-intensive and compute-intensive workloads.

TABLE 5

| workload | | | | |
| --- | --- | --- | --- | --- |
| Memory-intensive programs | | | | |
| M1 | lbm | milc | soplex | libquantum |
| M2 | lbm | milc | leslie3d | libquantum |
| M3 | lbm | milc | soplex | leslie3d |
| M4 | lbm | soplex | libquantum | leslie3d |
| M5 | milc | soplex | libquantum | leslie3d |
| M6 | mcf | mcf | mcf | mcf |
| M7 | mcf | mcf | astar | astar |
| M8 | astar | astar | astar | astar |
| Mixed programs | | | | |
| MIX1 | lbm | milc | bzip2 | bzip2 |
| MIX2 | lbm | milc | omnetpp | omnetpp |
| MIX3 | lbm | soplex | omnetpp | omnetpp |
| MIX4 | milc | soplex | omnetpp | omnetpp |
| MIX5 | lbm | milc | omnetpp | bzip2 |
| MIX6 | milc | soplex | omnetpp | bzip2 |
| Compute-intensive programs | | | | |
| C1 | bzip2 | bzip2 | bzip2 | bzip2 |
| C2 | hmmer | hmmer | hmmer | hmmer |
| C3 | gromacs | bzip2 | omnetpp | h264ref |
| C4 | gromacs | bzip2 | sjeng | h264ref |
| C5 | gromacs | omnetpp | sjeng | h264ref |
| C6 | bzip2 | omnetpp | sjeng | h264ref |

Each workload consisted of four programs from one of these groups to represent a memory-intensive workload or compute intensive workload accordingly. Memory-intensive workloads were used to demonstrate the benefit of multi-bus mode, and the compute-intensive workloads to demonstrate that there are negligible side-effects. Without losing generality, six MIX workloads were included having mixed memory and compute-intensive programs, which demonstrated moderate performance benefits.

Simulated regions of 200 million instructions were selected for each benchmark based on their memory characteristics collected from Pin. The regions were independently executed to gather instructions per cycle (IPC), last-level-cache misses per 1,000 instructions (LLC MPKI), row buffer hit ratio, and bandwidth, as shown in Table 6. Table 6 lists memory statistics for the benchmarks.

TABLE 6

| Benchmark | IPC | LLC MPKI | Row buffer hit ratio | Bandwidth (MByte/s) |
| --- | --- | --- | --- | --- |
| libquantum | 0.30 | 58.14 | 96% | 4441.57 |
| milc | 0.16 | 41.86 | 81% | 3641.48 |
| leslie3d | 0.62 | 20.72 | 85% | 3311.84 |
| soplex | 0.31 | 31.34 | 80% | 2501.53 |
| lbm | 0.36 | 23.12 | 87% | 2151.90 |
| mcf | 0.15 | 57.54 | 19% | 2138.81 |
| astar | 0.25 | 29.12 | 51% | 1871.53 |
| omnetpp | 1.38 | 0.49 | 83% | 172.09 |
| gromacs | 1.34 | 0.38 | 82% | 129.60 |
| h264 | 1.13 | 0.13 | 32% | 38.03 |
| bzip2 | 1.13 | 0.12 | 94% | 35.54 |
| hmmer | 1.95 | 0.00 | 38% | 0.28 |

The bandwidth and LLC MPKI numerically portray memory access intensity, making them indicators of potential benefits of embodiments of the present invention. Row buffer hit ratio revealed the memory access locality and latency. Programs with low row buffer hit ratios suffered from longer bank access latency due to the row buffer miss penalty. Longer memory accesses increased the queue delay, which impeded the following incoming requests in the buffer.

The simulation for a workload did not end until the slowest program finished its 200 million instructions. Faster programs continued running after committing the first 200 million instructions. Execution time of each program was collected after the program finished its instructions. The compute-intensive programs of MIX workloads ran 600 million instructions, which prolonged the execution time compared to that of memory-intensive benchmarks in the same group.

Figure 8:
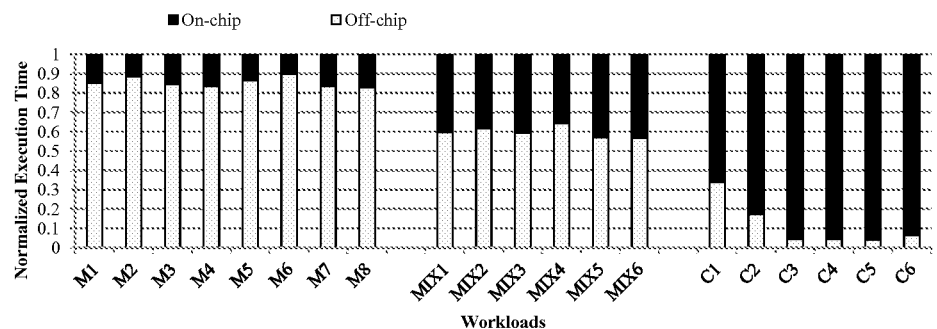
FIG. 8 is a chart depicting normalized off-chip and on-chip latencies for selected workloads against a total execution time, according to an exemplary embodiment of the present invention.

The execution latency of a program may be composed of on-chip and off-chip latency. The percentage of latency in the total execution time may reveal which factor tends to be more influential to the overall performance of a workload. Referring to FIG. 8, a chart depicting normalized off-chip and on-chip latencies for the selected workloads in the three categories against the total execution time is shown. Specifically, more than 80% of the latency of memory-intensive workloads came from off-chip latency, while more than 60% of the latency of compute-intensive workloads came from on-chip latency. These results implied that the memory-intensive and mixed workloads may be sped up by Pin Switching.

Figure 9:
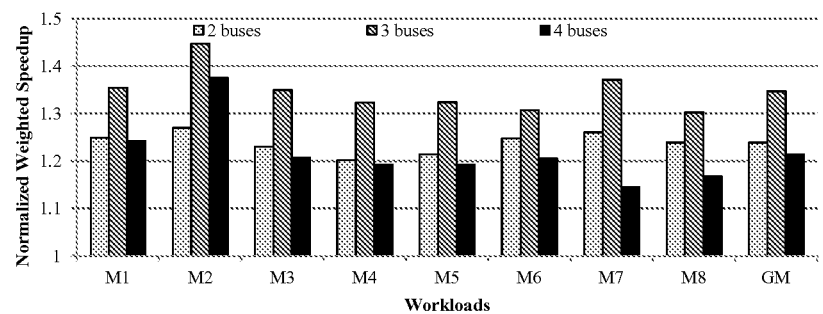
FIG. 9 is a chart depicting performance improvements of memory-intensive workloads enhanced by 2, 3, and 4 buses, according to an exemplary embodiment of the present invention.

Referring to FIG. 9, a chart depicting performance improvements of memory-intensive workloads enhanced by 2, 3, and 4 buses is shown. The weighted speedup of each case may be normalized against its own baseline. In embodiments, the baseline may be the simulated system fixed in the single-bus mode with the corresponding number of buses and DRAM devices when the processor runs at 4.0 GHz. Remarkably, the improvements experienced with 3 buses consistently surpassed 2 and 4 buses in all workloads. These results stem from the balance between core performance and off-chip bandwidth that the 3 buses experience to maximize the throughput of the simulated system. Based on the exemplary hardware configuration and selected workloads of the present invention, the multi-bus mode with 3 buses may be optimal, and considered the default configuration.

Figure 10:
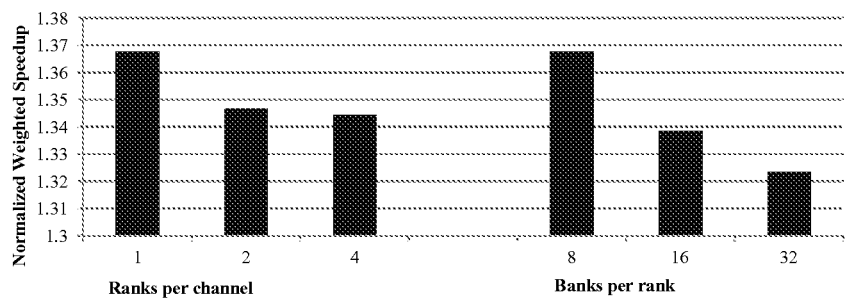
FIG. 10 is a chart illustrating performance improvements for multi-bus mode tested using various DRAM configurations, according to an exemplary embodiment of the present invention.

In FIG. 10, a chart illustrating performance improvement for multi-bus mode tested using various DRAM configurations is shown. The weighted speedup for each configuration may be normalized against the same configuration in single-bus mode. As shown in FIG. 10, all banks and ranks have weighted speedups greater than 32%. As the number of ranks per channel or the number of banks per rank increases, improvement may be slightly diminished due to the resulting lower row buffer hit ratio causing shorter bank access latency.

Figure 11:
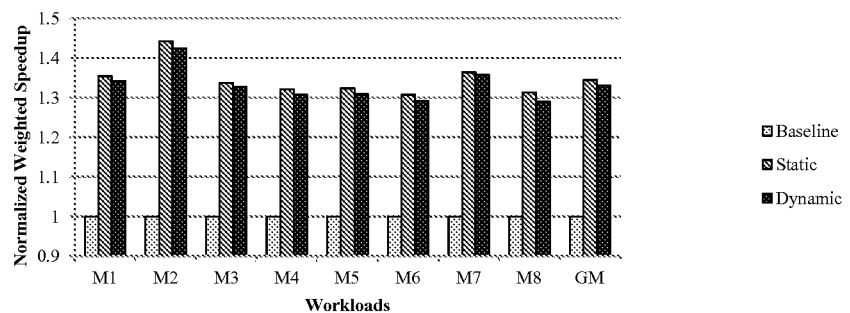
FIG. 11 is a chart depicting benefits of Static Switching and Dynamic Switching with 3 buses versus the baseline of a simulated system that does not use the pin switch mechanism on memory-intensive workloads, according to an exemplary embodiment of the present invention.

Referring to FIG. 11, a chart depicting benefits of Static Switching and Dynamic Switching with 3 buses versus the baseline of a simulated system that does not use the pin switch mechanism on memory-intensive workloads is shown. In embodiments, both schemes were able to speed up the execution of all workloads by more than 1.3 times. In an exemplary embodiment, an approximately 42% performance improvement was observed for M2. The geometric means of Static Switching and Dynamic Switching are 1.34 and 1.33 respectively, due to more than 99% of the running time being identified as typical memory-intensive phases by Dynamic Switching.

Figure 12:
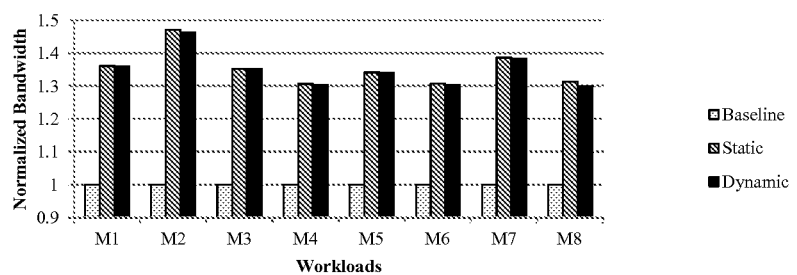
FIG. 12 is a chart depicting increased bandwidth due to pin switching, according to an exemplary embodiment of the present invention.

FIG. 12 is a chart depicting benefits of multi-bus mode attributed to increased consumed bandwidth due to pin switching. The increase of the bandwidth is similar to that of the weighted speedup in FIG. 11. In an example embodiment, M2 and M7 gained 47% and 39% off-chip bandwidth when switching from the single-bus mode to the multi-bus mode for static switching, while their performances improved by 44% and 36% respectively. This similarity may be attributed to the fact that their execution latencies were largely dominated by off-chip latency. On the other hand, Dynamic Switching achieved a slightly smaller increase in bandwidth, which resulted in its performance being close to that of Static Switching.

In embodiments of the present invention, the throughput improvement of Dynamic Switching may be strengthened by using prefetchers which may utilize extra bandwidth brought by additional buses. In exemplary embodiments, a stride prefetcher may be used in the last level cache to demonstrate this benefit. However, any other more or less sophisticated prefetchers may also be employed to further improve the system performance. The stride prefetcher may have a prefetch degree of 1, 2, or 4, which denotes the number of prefetches issued on every memory reference.

Figure 13:
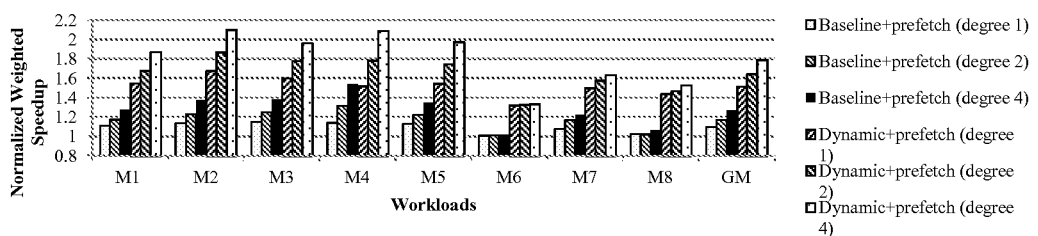
FIG. 13 is a chart depicting improved throughput of Dynamic Switching boosted by a stride prefetcher for memory-intensive workloads, according to an exemplary embodiment of the present invention.
Figure 14:
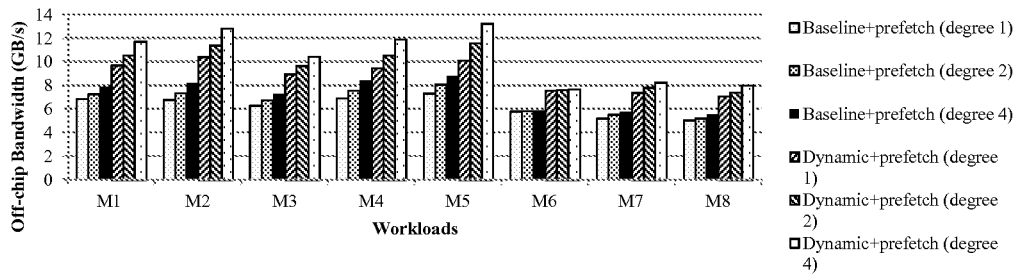
FIG. 14 is a chart depicting improvements in off-chip bandwidth of Dynamic Switching boosted by a stride prefetcher for memory-intensive workloads, according to an exemplary embodiment of the present invention.

FIG. 13 is a chart depicting improved throughput of Dynamic Switching boosted by a stride prefetcher (degree=1, 2, 4) for memory-intensive workloads. FIG. 14 is a chart depicting improvements in off-chip bandwidth of Dynamic Switching being improved by a stride prefetcher (degree=1, 2, 4) for memory-intensive workloads. As shown in FIG. 13, the geometric mean of the performance improvements of Dynamic Switching for all memory-intensive workloads with a prefetch degree of 1, 2, and 4 are 1.51, 1.64, and 1.79 respectively, compared with those of the baseline, which are 1.10, 1.17, and 1.27. The gap of the improvements between Dynamic Switching and the baseline may increase as the prefetch degree increases, thereby implying that an aggressive stride prefetch may benefit more from Dynamic Switching. This observation may be demonstrated in all workloads except M6, which only gained a slight performance improvement from increasing the prefetch degree, since the stride prefetcher has a low coverage on mcf. This performance improvement may be verified by the higher consumed off-chip bandwidth of Dynamic Switching shown in FIG. 14, thereby implying that Dynamic Switching may boost the performance of the prefetch by providing more off-chip bandwidth.

Figure 15:
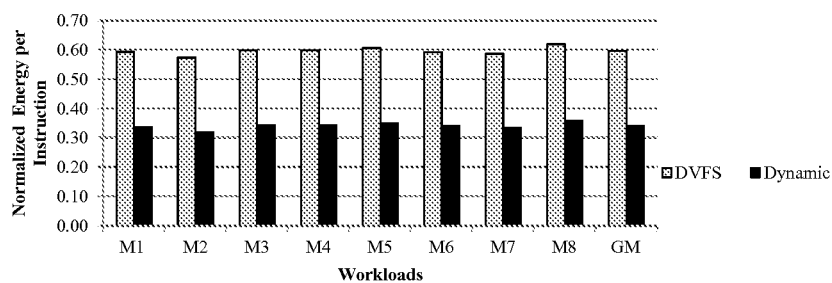
FIG. 15 is a chart depicting energy efficiency improvements in off-chip bandwidth of Dynamic Switching for memory intensive workloads with 3 buses, according to an exemplary embodiment of the present invention.

The energy efficiency of the system may be also improved by Dynamic Switching. Referring to FIG. 15, a chart depicting energy efficiency improvements of the simulated system is shown. In particular, FIG. 15 shows normalized EPI of Dynamic Switching for memory intensive workloads with 3 buses, and the EPI from DVFS (running on 2.4 GHz with the single bus). Generally, energy savings may come from two sources: (1) low voltage and frequency scaling; and (2) the execution reduction time stemming from multiple buses brought by pin switching. In embodiments, the first part may be quantified by setting the core frequency of the simulated system to 2.4 GHz (relating to the frequency of the multi-bus mode scheme of the present invention) with the corresponding voltage for single bus. The results depicted as gray bars in FIG. 15 demonstrated a 40% improvement in the geometric mean of the EPI for all the workloads over the baseline. The overall execution time of this setting was only slightly longer than that of the baseline system because all the workloads were memory-intensive. Furthermore, the multibus mode offered an average of 66% improvement in the geometric mean of the EPI for all the workloads over the baseline resulting from execution time reduction.

Figure 16:
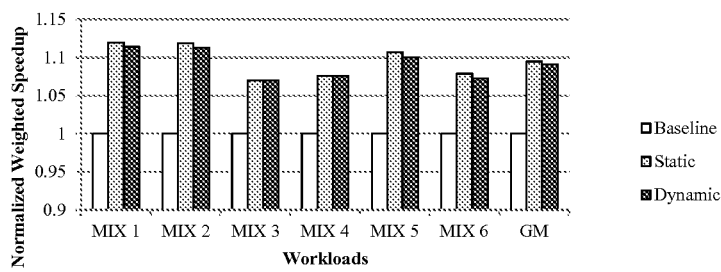
FIG. 16 is a chart depicting system performance improvement of compute-intensive and memory-intensive workloads using Static Switching and Dynamic Switching, according to an exemplary embodiment of the present invention.

FIG. 16 is a chart depicting system performance improvement of mixed workloads using Pin Switching. Particularly, FIG. 16 shows normalized weighted speedup of compute-intensive and memory-intensive workloads boosted by Static Switching and Dynamic Switching. In embodiments, the highest benefit may be achieved using 2 buses and per-core DVFS. In exemplary embodiments, the geometric means of the normalized weighted speedup from using Static Switching and Dynamic Switching were 1.10 and 1.09 respectively, thereby implying that Dynamic Switching captures the most benefit of Pin Switching for these mixed workloads.

Figure 17:
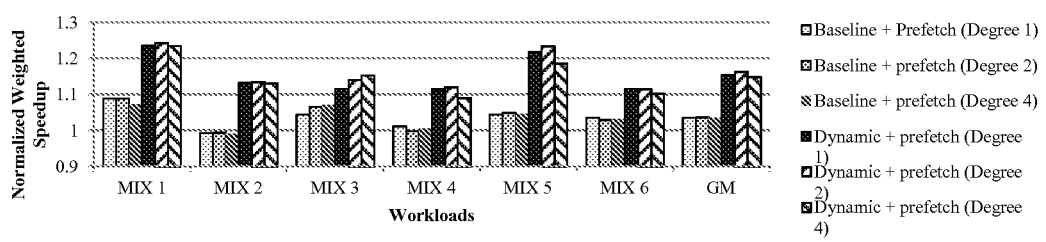
FIG. 17 is a chart depicting improved throughput of Dynamic Switching boosted by a stride prefetcher for mixed workloads, according to an exemplary embodiment of the present invention.

FIG. 17 is a chart depicting improved throughput of Dynamic Switching boosted by a stride prefetcher for mixed workloads. Particularly, FIG. 17 shows the co-improvement of Pin Switching and stride prefetching with varying degrees (1, 2, 4) compared with the improvement of the prefetching alone. In exemplary embodiments, the geometric means of the normalized weighted speedup of Dynamic Switching with prefetching degree (1, 2, 4) were 1.15, 1.16, 1.15 respectively, while the means with prefetching alone were all 1.04. In embodiments, the co-optimization for all workloads saturated, or even slightly dropped, as the degree increased, implying that aggressive prefetching wastes off-chip bandwidth rather than exploiting the benefit of MLP for workloads. This result may be confirmed by observing the performance of the baseline using prefetching alone as the degree increases.

Figure 18:
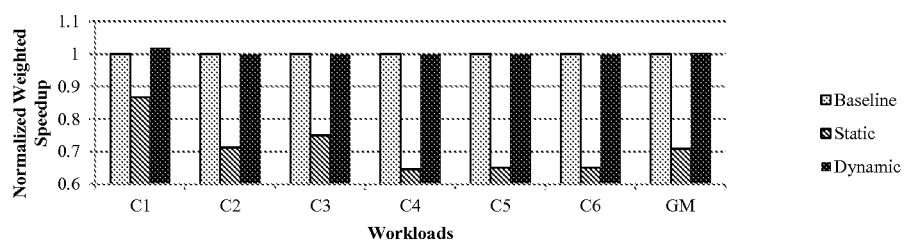
FIG. 18 is a chart depicting Dynamic Switching efficiency of compute-intensive workloads in comparison to Static Switching at the cost of lower core frequency and the baseline, according to an exemplary embodiment of the present invention.

FIG. 18 is a chart depicting the Dynamic Switching efficiency of compute-intensive workloads in comparison to Static Switching at the cost of lower core frequency and the baseline. In exemplary embodiments, the geometric mean of performance degradation for compute-intensive workloads introduced by the Static Switching scheme was 29%. In embodiments, the worst case resulted in a 35% slowdown of C5. In contrast, Dynamic Switching retained the same performance as the baseline during compute-intensive workloads because the metric provided by embodiments of the present invention successfully identified non-memory-intensive phases when the rewards of the multi-bus mode were limited. Furthermore, Dynamic Switching surpassed the baseline for the C1 workload by identifying compute-intensive and memory-intensive phases. Overall, embodiments of the present invention provided for Dynamic Switching that exhibited no performance penalty on compute-intensive workloads, in contrast to Static Switching. The energy consumption of the Dynamic Switching mechanism was almost the same as the baseline since the processor ran at single-bus mode most of the time for compute-intensive programs.

In embodiments of the present invention, a method of increasing off-chip bandwidth is provided. The method includes designing a circuit having switchable pins, replacing a portion of allocated pins of a processor with the switchable pins, connecting the processor to a memory interface configured to dynamically switch the switchable pins between a power mode and a signal mode, providing a metric configured to identify which of the power mode and the signal mode is most beneficial during a 1 millisecond interval, and switching the switchable pins to signal mode during intervals where the signal mode provides more benefit than the power mode. The method includes utilizing cache block prefetching techniques to amplify benefits of the switchable pins. The method includes utilizing an off-chip bus connection to switch from a multi-bus mode to a single-bus mode and vice-versa. The method further includes allocating not more than three additional buses via pin switching.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted.

What is claimed is:

1. A method of increasing off-chip bandwidth, comprising:
    designing a circuit having switchable pins;
    replacing a portion of allocated pins of a processor with the switchable pins;
    connecting the processor to a memory interface configured to dynamically switch the switchable pins between a power mode and a signal mode;
    providing a metric configured to identify which of the power mode and the signal mode is most beneficial during a 1 millisecond interval;
    switching the switchable pins to signal mode during intervals where the signal mode provides more benefit than the power mode; and
    utilizing an off-chip bus connection to switch from a multi-bus mode to a single-bus mode and vice-versa, the circuit including
        a first circuit having a signal-to-power switch and a first set of five stage tri-stage buffers connected to the signal-to-power switch, wherein the first set of five stage tri-stage buffers are placed in signal lines to amplify I/O signals to compensate for parasitic capacitances of the signal-to-power switch, and wherein the signal-to-power switch allows for the switchable pins to alternate between the multi-bus and single-bus mode;
        a second circuit having a signal switch and a second set of five stage tri-stage buffers connected to the signal switch, wherein the second set of five stage tri-stage buffers enable memory devices that can be accessed via buses, and wherein the signal switch ensures that data in the memory interface can be accessed in the multi-bus and single-bus modes; and
        a third circuit having a signal buffer that amplifies the I/O signals in order to offset effects of parasitic capacitance, and
        wherein the signal-to-power switch and signal switch are configured to route signals and power in the multi-bus and single-bus modes.

2. The method of claim 1, further comprising utilizing cache block prefetching techniques to amplify benefits of the switchable pins.

3. The method of claim 1, further comprising allocating not more than three additional buses via pin switching.

4. The method of claim 1, wherein the metric is switching benefit, $B_{ij}(T_c)$, wherein $B_{ij}(T_c)$ represents the estimated reward for running the interval following time $T_c$ in mode j instead of mode i.

5. The method of claim 3, wherein the multi-bus mode includes N number of buses connected to private DRAM interfaces via individual buses and the single-bus mode includes a single bus connected to a private DRAM interface.

6. The method of claim 4, wherein the switching benefit, $B_{ij}(T_c)$, is calculated using the following equation:

$$B_{ij}(T_c) = \Sigma_{k=1}^{P}(WS_{j,k}(T_c) - WS_{i,k}(T_c)),$$

wherein $WS_{i,k}(T_c)$ and $WS_{j,k}(T_c)$ are estimated weighted speedups for program k at time $T_c$ in mode i and mode j respectively, and p is the number of simultaneously executing programs.

7. The method of claim 5, further comprising using a memory controller to assist in switching between the multi-bus and single-bus modes.

8. The method of claim 6, wherein based on a history of the switching benefit, $B_{ij}(T_c)$, $\tilde{B}_{ij}(T_c)$ is predicted as a switching benefit for a following interval using the equation: $\tilde{B}_{ij}(T_c) = \Sigma_{k=1}^{N} B_{ij}(T_c - k*T_{interval})$, wherein $B_{ij}(T_c - k*T_{interval})$ represents switching benefit, $B_{ij}(T_c)$, and is measured from N intervals ago.

9. The method of claim 7, wherein the memory controller includes:

a front arbiter;

N dedicated request queues configured to individually receive incoming requests from the front arbiter;

an end arbiter that fetches requests residing in the queues, wherein the requests are fed via corresponding DRAM interfaces into corresponding DIMMs while in the multi-bus mode, wherein the requests are fed via a single DRAM interface into attached DIMMs as appended ranks while in the single-bus mode.

10. The method of claim 8, wherein the method includes:

staying in mode i if the predicted switching benefit, $\tilde{B}_{ij}(T_c)$, is negative;

switching to mode j if the predicted switching benefit, $\tilde{B}_{ij}(T_c)$, is positive.

11. The method of claim 9, further comprising employing XOR banking indexing to reduce row-buffer conflicts.

12. The method of claim 10, wherein the weighted speedup is calculated using the following equation:

$$\text{Weighted Speedup} = \sum_{i=0}^{n-1} \frac{1/T_i^{Shared}}{1/T_i^{Alone}}$$

wherein $T_i^{Shared}$ and $T_i^{Alone}$ denote an execution time of a single program running alone, and an execution time of a single program running with other programs, respectively.

13. The method of claim 11, further comprising analyzing signal integrity to demonstrate feasibility in the multi-bus and single-bus modes.

14. A circuit, comprising:

switchable pins;

a first circuit having a signal-to-power switch and a first set of five stage tri-stage buffers connected to the signal-to-power switch, wherein the first set of five stage tri-stage buffers are placed in signal lines to amplify I/O signals to compensate for parasitic capacitances of the signal-to-power switch;

a second circuit having a signal switch and a second set of five stage tri-stage buffers connected to the signal switch, wherein the second set of five stage tri-stage buffers enable memory devices that can be accessed via buses; and a third circuit having a signal buffer, wherein the signal-to-power switch allows for the switchable pins to alternate between a multi-bus mode and single-bus mode, wherein the signal switch ensures that data in the memory interface can be accessed in the multi-bus and single-bus modes, wherein both the signal-to-power switch and signal switch are configured to route signals and power in the multi-bus and single-bus modes, wherein the signal buffer amplifies the I/O signals in order to offset effects of parasitic capacitance.

15. The circuit of claim 14, wherein the switchable pins are configured to switch between a power mode and a signal mode.

* * * * *